April 26, 1960   M. R. FINK   2,934,150

PRESSURE-CONTOURED SPINNER

Filed Dec. 21, 1955

SPINNER LEADING EDGE DATUM

INVENTOR
MARTIN R. FINK

Leonard F. Welblind
ATTORNEY

United States Patent Office 2,934,150
Patented Apr. 26, 1960

2,934,150

PRESSURE-CONTOURED SPINNER

Martin R. Fink, Glastonbury, Conn., assignor to United Aircraft Corporation, East Hartford, Conn., a corporation of Delaware Application December 21, 1955, Serial No. 554,505

2 Claims. (Cl. 170—159)

This invention relates to drag-reducing devices for aerodynamic bodies and more particularly to drag reduction at the juncture of airfoils with aircraft bodies.

It is an object of this invention to provide primarily a pressure-contoured spinner for a propeller but the principle involved is equally adaptable to turbomachinery blading in order to alleviate local flow separation.

It is a further object of this invention to provide an indented contour for a propeller spinner adjacent the juncture of the blade therewith.

These and other objects of this invention will become readily apparent from the following detailed description of the drawing in which.

The performance of annular inlets for turboprop installations generally exhibits adverse compressibility effects at high subsonic flight Mach numbers as a result of the creation of supercritical velocities caused by use of thick propeller shanks whereby boundary layer separation is encountered on the blades and portions of the spinner surface adjacent the juncture of the blade and spinner. Such flow separation increases the drag, reduces inlet pressure recovery, causes nonuniform velocity distribution within the powerplant inlet duct and increases overall propeller torque and cowl drag.

These regions of local supersonic flow which exist on the spinner and propeller cuff at subsonic flight speeds and which terminate at shock waves occur as relatively small supercritical regions within a flow pattern in which the local velocities both near the spinner nose and behind the propeller cuffs are moderate subsonic velocities. These small supercritical regions are surrounded by regions of moderate subsonic Mach numbers rather than being part of a flow pattern in which transonic (low supersonic or high subsonic) Mach numbers exist at large distances from physical surfaces. Therefore a subsonic concept of pressure-contouring is a more applicable solution to the problem of propeller spinner flow interaction rather than a solution which is based on the assumption that the velocity of the entire flow region is nearly sonic. One theory based on the last-mentioned assumption is the well-known transonic area rule.

The pressure contour is obtained by shaping the propeller spinner at the juncture of the blade root such that the velocity of the air relative to the airfoil in this region can be held substantially constant.

Figure 1:
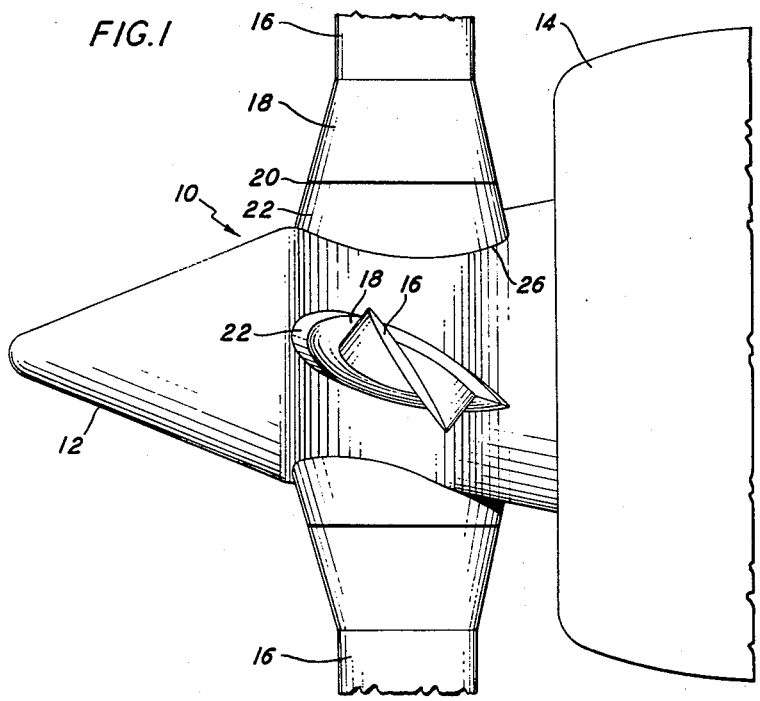
Fig. 1 is a side view of a propeller spinner combination utilizing this invention.

Thus, for example, as shown in Fig. 1 a propeller is generally indicated at 10 as having a streamlined spinner 12 which terminates within a cowling 14 and between which is formed an annular inlet for a suitable powerplant not shown. A propeller hub (not shown) enclosed by the spinner 12 carries a plurality of variable pitch blades 16 which carry substantially thick cuffs 18.

The cuffs 18 terminate adjacent to lines 20 which represent the outer radial extremity of cooperating cuffs 22 fixed relative to the spinner 12. The fixed cuffs 22 will have an angle of attack such that they will provide maximum thrust during the cruise condition such that the portion 22 and the cuff portion 18 of the blades 16 will be in substantial alignment. Also the cuffs represent a relatively large airfoil section both in thickness and chord.

Figure 2:
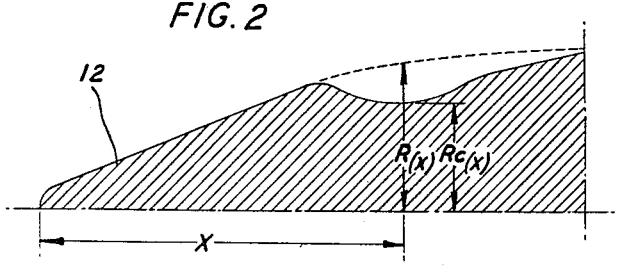
Fig. 2 is a cross-sectional schematic view of the indented spinner according to this invention and Fig. 3 is a cross-sectional view indicating the thickness dimension of the propeller blade root.
Figure 3:
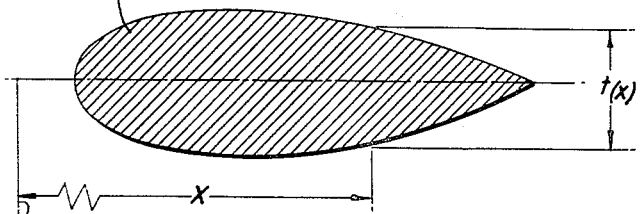

Accordingly to this invention the spinner 12 has an indentation defined by the line 26 which forms the junction between the spinner and the cuff 22. As shown in Fig. 2 the spinner 12 would normally have a radius R which would vary along the axis of propeller rotation such that the spinner is of substantially conical shape. The identation, on the other hand, has a radius $R_c$ which will vary along the axis of propeller rotation and may vary somewhat with angular positions in a plane normal to that axis. As further seen in Fig. 3 the blade cuff or shank at its juncture with the propeller spinner will have a thickness $t$ which in turn will vary along its chord or for purposes herein along the axis of propeller rotation.

For large ratios of propeller spinner diameter to blade root chord where the problem of supercritical local velocities is prominent the local radius $R_c(x)$ of the indented spinner at each axial location $x$ (where the fact that the size of a quantity depends upon the axial location at which it is measured is denoted in the conventional mathematical way by writing the symbol for that quantity followed by an $x$ in parentheses) may be obtained by subtracting from the local spinner radius $R(x)$ a length equal to the local thickness of the blade root chord airfoil section, divided by twice the square root of the difference between unity and the square of the subsonic Mach number which would occur at that axial location on the spinner at the design flight Mach number if the propeller blades were absent. Thus for a given design flight Mach number the variation of local Mach number which would exist along the spinner in the absence of the propeller blades must be known, and that local Mach number $M(x)$ is used in the calculation of the local radius of the indented spinner. The local radius of the indented portion of the spinner may be defined as follows:

$$R_c(x) = R(x) - \frac{t(x)}{2\sqrt{1-[M(x)]^2}}$$

where $R_c(x)$ = radius of spinner at axial location $x$ after indentation $R(x)$ = radius of spinner at axial location $x$ before indentation $t(x)$ = thickness of the propeller airfoil at the blade root at axial location $x$ $M(x)$ = Mach number of the airstream which would exist at axial location $x$ adjacent to the spinner in the absence of the propeller and at the design flight Mach number This indentation is applied axisymmetrically, that is, the spinner radius at station $x$ is made equal to $R_c(x)$ not only adjacent to each blade but at all positions around the entire circumference of the spinner, in other words, on the spinner surface at station $x$ and between the propeller blades. Thus a contouring of the spinner is provided such that the presence of the indentation tends to decrease the subsonic velocity of the air relative to the spinner at locations adjacent to the spinner where the presence of the propeller blades tends to increase the velocity of the air relative to the spinner. Acceleration of an otherwise subsonic flow to local supercritical velocities, as is usually caused by the presence of the thick propeller cuffs, therefore would be avoided because the velocities at the blade-spinner junction will remain substantially constant in a blade chord-wise direction.

Thus as a result of this invention, a propeller spinner combination is provided which reduces flow separation on the spinner and propeller blades and which increases the flight Mach number at which shock waves will form on thick propeller blade cuffs and/or platforms. Thus the propeller is capable of overall operation at higher subsonic flight Mach numbers at extremely low drag. Actual tests indicate that reduction in pressure drag as high as 45% can be obtained by use of this invention.

Although only one embodiment of this invention has been illustrated and described herein, it will be apparent that various changes in the modifications may be made in the arrangement and construction of the various parts without departing from the scope of this novel concept.

What it is desired by Letters Patent is:

I claim:

1. In an aircraft propeller having a hub and a plurality of blades carried by said hub, said blades including a shank end and having a substantially large airfoil shaped blade portion and a streamlined spinner surrounding said hub and being of substantially conical shape, said spinner having a concave surface portion on its external surface including a cuff fixed to said spinner and located in juxtaposed relation with said blade portion thereby forming an inboard continuation of said blade airfoil shape, said concave portion being indented at each axial location throughout the extent of the cuff by an amount equal to the local thickness of the root chord of said cuff at that axial location divided by twice the square root of the difference between unity and the square of the subsonic local Mach number which would occur at that axial location on the spinner at the design flight Mach number if the propeller blades were absent, said design flight Mach number being a function of the speed at which the aircraft is designed to fly during cruise and at average temperature conditions and said concave portion extending around the entire circumference of the spinner.

2. In an aircraft propeller having a hub and a plurality of blades carried by said hub, each of said blades including a shank end having an airfoil shaped blade portion of substantial thickness, and a streamlined shaped spinner surrounding said hub and being of substantially conical shape, said spinner having a cuff fixed thereto and radially extending therefrom with its outer end in juxtaposed relation with the inboard end of said blade portion and forming a continuation thereof, an external surface portion on said spinner forming a junction with the inboard end of said cuff, said external surface portion being axisymmetrically indented around the entire circumference of the spinner and throughout the chordwise length of said cuff whereby the radius of curvature of the indentation at any point along the spinner axis is defined substantially as follows:

$$R_c(x) = R(x) - \frac{t(x)}{2\sqrt{1-[M(x)]^2}}$$

where $R_c(x)$ = radius of the indented spinner at axial location $x$
$R(x)$ = radius of the unindented spinner at axial location $x$
$t(x)$ = thickness of the cuff adjacent to the spinner at axial location $x$
$M(x)$ = the local Mach number of the airstream which would exist at axial location $x$ and adjacent to the spinner in the absence of the propeller and at the design flight Mach number which flight Mach number is a function of speed at which the aircraft is designed to fly during cruise at average temperature conditions.

References Cited in the file of this patent

UNITED STATES PATENTS

| | | |
|---|---|---|
| 2,297,226 | Muller-Keuth et al. | Sept. 29, 1942 |
| 2,408,677 | Owner | Oct. 1, 1946 |
| 2,498,072 | Dean | Feb. 21, 1950 |
| 2,522,083 | Avondoglio | Sept. 12, 1950 |
| 2,612,227 | Cushman | Sept. 30, 1952 |

OTHER REFERENCES

NACA Research Memorandum L52H108, dated September 3, 1952, entitled, "A Study of Zero-Lift Drag Rise Characteristics of Wing-Body Combinations Near the Speed of Sound."